United States Patent
Moss et al.

(10) Patent No.: US 11,488,332 B1
(45) Date of Patent: *Nov. 1, 2022

(54) INTENSITY DATA VISUALIZATION

(71) Applicant: Scale AI, Inc., San Francisco, CA (US)

(72) Inventors: Evan Moss, San Francisco, CA (US); Steven Hao, San Jose, CA (US); Leigh Marie Braswell, San Francisco, CA (US)

(73) Assignee: SCALE AI, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/186,313

(22) Filed: Feb. 26, 2021

Related U.S. Application Data

(63) Continuation of application No. 16/518,820, filed on Jul. 22, 2019, now Pat. No. 10,937,202.

(51) Int. Cl.

| | |
|---|---|
| *G06T 11/00* | (2006.01) |
| *G06T 7/90* | (2017.01) |
| *G06F 3/048* | (2013.01) |
| *H04L 67/10* | (2022.01) |
| *G01S 7/51* | (2006.01) |
| *G06F 3/04847* | (2022.01) |
| *G01S 7/48* | (2006.01) |

(52) U.S. Cl.
CPC .......... *G06T 11/001* (2013.01); *G01S 7/4802* (2013.01); *G01S 7/51* (2013.01); *G06F 3/04847* (2013.01); *G06T 7/90* (2017.01); *H04L 67/10* (2013.01); *G06T 2200/24* (2013.01); *G06T 2207/10024* (2013.01); *G06T 2207/10028* (2013.01); *G06T 2207/10044* (2013.01)

(58) Field of Classification Search
CPC combination set(s) only.
See application file for complete search history.

(56) References Cited

U.S. PATENT DOCUMENTS

| | | |
|---|---|---|
| 9,165,383 B1 * | 10/2015 | Mendez-Rodriguez ............ G06T 11/001 |
| 10,353,073 B1 | 7/2019 | Anderberg |
| 2009/0231327 A1 | 9/2009 | Minear et al. |
| 2010/0208981 A1 | 8/2010 | Minear et al. |
| 2011/0115812 A1 | 5/2011 | Minear et al. |
| 2012/0038751 A1 | 2/2012 | Yuan et al. |
| 2012/0327083 A1 | 12/2012 | Nishimura et al. |
| 2017/0287216 A1 | 10/2017 | Kim |
| 2018/0262737 A1 | 9/2018 | Monnier et al. |
| 2019/0311487 A1 * | 10/2019 | Xiao ............ G01S 17/89 |
| 2019/0331497 A1 * | 10/2019 | Vora ............ G01S 17/86 |

(Continued)

*Primary Examiner* — Wesner Sajous
(74) *Attorney, Agent, or Firm* — Artegis Law Group, LLP

(57) ABSTRACT

Techniques for coloring a point cloud based on colors derived from LIDAR (light detection and ranging) intensity data are disclosed. In some embodiments, the coloring of the point cloud may employ an activation function that controls the colors assigned to different intensity values. Further, the activation function may be parameterized based on statistics computed for a distribution of intensities associated with a 3D scene and a user-selected sensitivity. Alternatively, a Fourier transform of the distribution of intensities or a clustering of the intensities may be used to estimate individual distributions associated with different materials, based on which the point cloud coloring may be determined from intensity data.

20 Claims, 9 Drawing Sheets

(56) References Cited

U.S. PATENT DOCUMENTS

2019/0339709 A1 11/2019 Tay et al.
2020/0125830 A1* 4/2020 Lei .......................... G06K 9/62
2020/0132822 A1* 4/2020 Pimentel ................ G01S 17/89
2020/0225356 A1 7/2020 Anderberg

* cited by examiner

INTENSITY DATA VISUALIZATION

CROSS-REFERENCE TO RELATED APPLICATIONS

This application is a continuation of the co-pending U.S. patent application titled, "INTENSITY DATA VISUALIZATION," filed on Jul. 22, 2019 and having Ser. No. 16/518,820. The subject matter of this related application is hereby incorporated herein by reference.

BACKGROUND

Technical Field

Embodiments of the present disclosure relate generally to data visualization and, more specifically, to visualizing intensity data.

Description of the Related Art

Advances in the field of machine learning and increases in available computing power have led to a proliferation in the applications of machine learning. Many machine learning models, including deep neural networks, require large amounts of labeled data to train and verify. Such labeled data typically includes samples that have been tagged with labels. For example, labeled images in which the classifications and locations of objects (e.g., people, cars, etc.) have been tagged may be used to train a machine learning model to perform object classification and localization.

Labeled data can be obtained by relying on human judgment to tag data with appropriate labels. However, such manual labeling of data is time consuming and labor intensive, and few traditional tools exist to facilitate the process of labeling data.

Light detection and ranging (LIDAR) data is a particular type of data that requires labeling in the field of autonomous vehicles. LIDAR is an optical remote-sensing technique that uses laser light to measure the distances to targets by illuminating the targets with pulsed laser light and measuring the reflected pulses with a sensor. LIDAR produces point cloud data, which typically includes intensity data indicating the strength of laser light reflected back to a LIDAR sensor (as opposed to diffused) for each point in the point cloud and laser pulse that generated the point. Simple color gradients have been applied to visualize LIDAR intensity data, with different intensity values mapping to different colors based on the color gradients. However, using such simple color gradients to visualize LIDAR intensity data is of limited benefit to users trying to label LIDAR point clouds.

As the foregoing illustrates, what is needed in the art are techniques to facilitate data labeling, and in particular labeling LIDAR data.

SUMMARY

One embodiment provides a computer-implemented method for visualizing intensity data. The method includes receiving intensity data associated with a scene, where the intensity data includes a point cloud and a plurality of intensity values associated with points in the point cloud. The method further includes determining a function that maps the plurality of intensity values to one or more colors based on a distribution of the plurality of intensity values. In addition, the method includes determining, based on the function and the plurality of intensity values, at least one of colors and sizes for the points in the point cloud, and rendering the point cloud based on the at least one of colors and sizes for the points.

Further embodiments include a non-transitory computer-readable storage medium storing instructions that, when executed by a computer system, cause the computer system to perform the method set forth above, and a computer system programmed to carry out the method set forth above.

One advantage of the disclosed techniques is that point cloud colorings can be determined from intensity data in different formats. In addition, materials with different reflectance properties can be shown in different colors. The different colors applied to materials can, in turn, facilitate the labeling of objects comprising such materials and/or verification of prior labeling. These technical advantages represent one or more technological advancements over prior art approaches.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
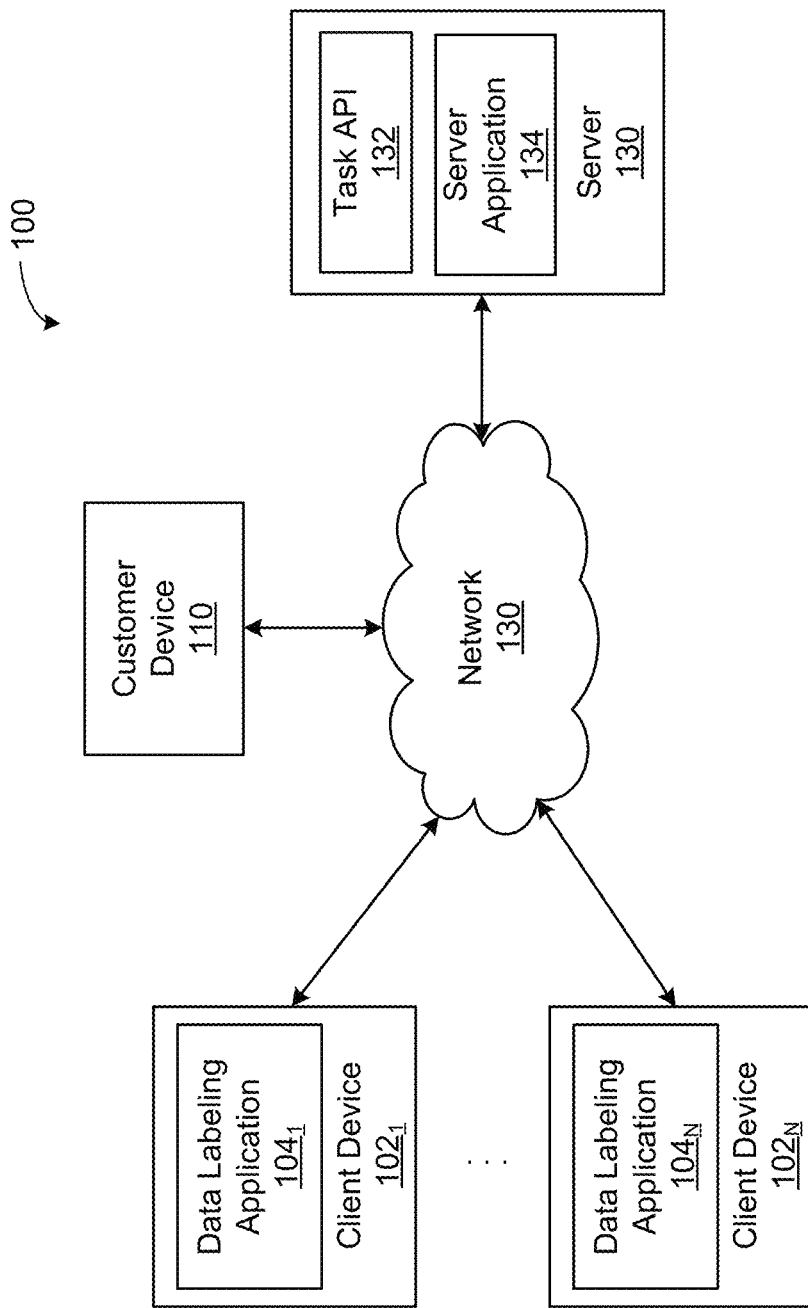
FIG. 1 is a conceptual illustration of a system configured to implement one or more embodiments.

FIG. 1 is a conceptual illustration of a system 100 configured to implement one or more embodiments. As shown, the system 100 includes, without limitation, a server computing device 130 and a number of client devices $102_{1-N}$, each of which is referred to individually herein as a client device 102, that interoperate to facilitate data labeling by users of the client devices $102_{1-N}$, in response to a customer request. The server 130, the client devices $102_{1-N}$, and a customer device 110 communicate via a network 130, which may be a wide area network (WAN) such as the Internet, a local area network (LAN), or any other suitable network. Although a single server 130 and customer device 110 are shown for illustrative purposes, the system 100 may generally include any number of servers, customer devices, and client devices, each of which may be a physical computing system or a virtual computing system running in, e.g., a data center or cloud.

Illustratively, the server 130 exposes a task application programming interface (API) 132 that allows customers to send data, and data labeling requests, via API calls. Any suitable data and labeling requests may be transmitted via such API calls to the server 130. For example, in the context of autonomous vehicles, photographic, LIDAR (light detection and ranging), and/or radar (radio detection and ranging) data captured by vehicle-mounted sensors may be uploaded from the customer device 110 to the server 130, along with a request that particular types of objects (e.g., vehicles, bicycles, pedestrians, etc.) be tagged in such data. GPS (global positioning system) data may also be uploaded and is typically included in LIDAR data.

In some embodiments, the server application 134 may require the data and data labeling requests submitted via API calls to satisfy predefined restrictions. For example, restrictions may exist on which classes (e.g., vehicles, pedestrians, buildings, etc.) of objects can be labeled, the format and size of the data, etc.

The server application 134 processes data received via the task API 132 and sends the processed data to data labeling applications $104_{1-N}$ running in the client devices $102_{1-N}$, along with indications of data labeling tasks to be performed by users of the client devices $102_{1-N}$, based on the customer's request. Any suitable processing of received data may be performed by the server application 134. For example, in some embodiments, the server application 134 could convert photographic, LIDAR, or radar data received in different formats to a single format that the data labeling applications $104_{1-N}$ can read. As another example, the server application 134 could compress the received data to a smaller size. Although the server application 134 is shown as a single application for illustrative purposes, it should be understood that functionality of the server application 134 may be performed by multiple applications or other types of software in alternative embodiments.

Each of the data labeling applications $104_{1-N}$, referred to individually herein as a data labeling application 104, digests and renders data received from the server application 134 for displayed via a user interface (UI). In some embodiments, the data labeling application 104 may render one or more colored point clouds for visualizing three-dimensional (3D) data (e.g., LIDAR and/or radar data), while permitting users to navigate and view the point clouds from different perspectives. As discussed in greater detail below, the data labeling application 104 may employ various techniques during the rendering of a point cloud. For example, in some embodiments, the data labeling application 104 may use down sampling to obtain an aggregated point cloud that includes only points conveying the most information. As another example, the data labeling application 104 could, based on a user specification, blend point cloud colorings derived from different data sources (e.g., photographic, label, and/or LIDAR intensity data). In addition to displaying rendered point clouds via a UI, the data labeling application 104 may also display photographs associated with those point clouds at the same time.

In some embodiments, the data labeling application 104 may provide tools to facilitate data labeling tasks. For example, the tools could allow a user to draw annotations in the form of cuboids, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
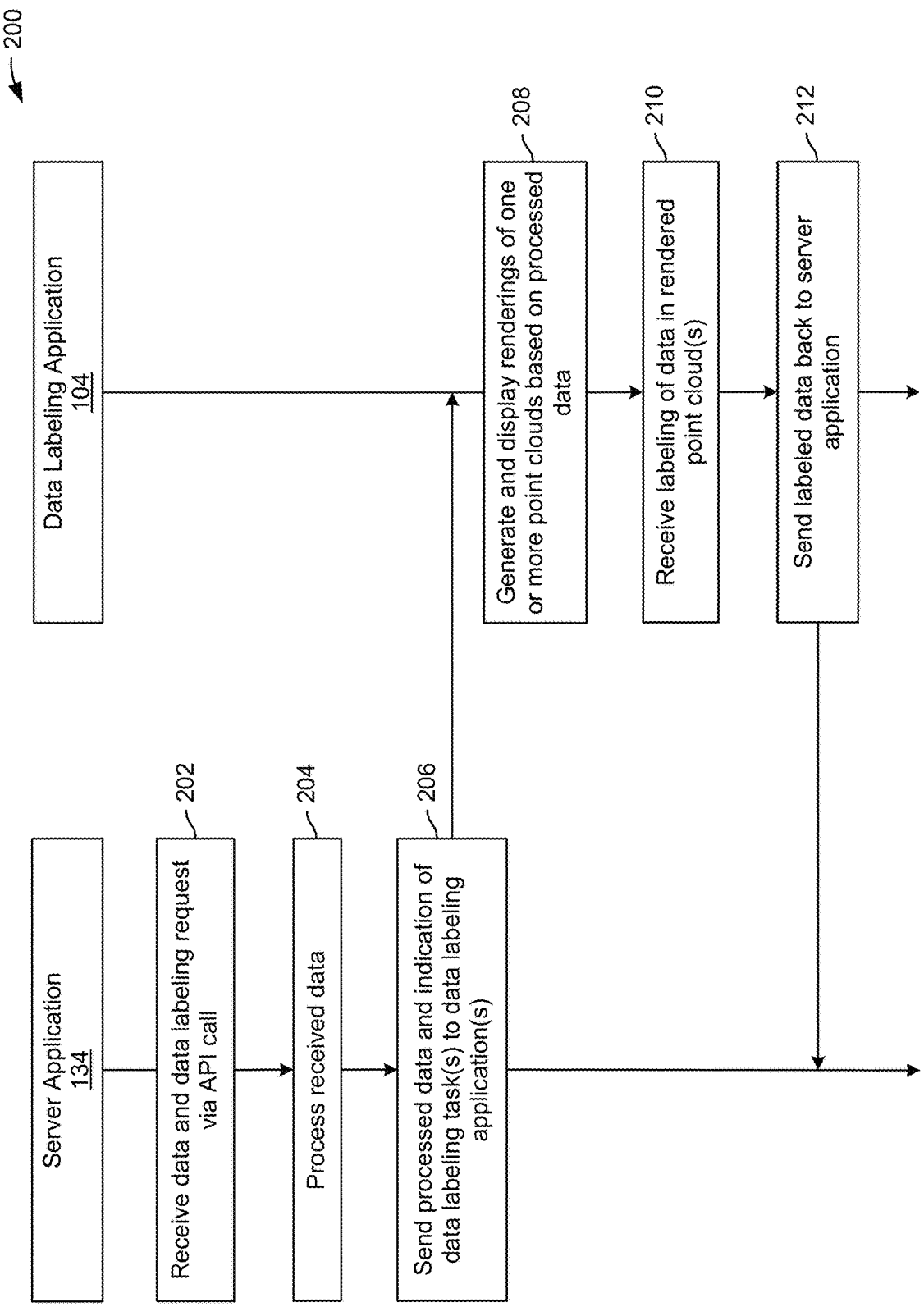
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where the server application 134 receives data and a data labeling request via an API call. The data may be in any suitable format acceptable to the server application 134. For example, the server application 134 may require data to be sent in one or more JavaScript Object Notation (JSON) files. Similarly, the data labeling request may need to satisfy certain restrictions, such as which classes (e.g., vehicles, pedestrians, buildings, etc.) of objects can be labeled.

At step 204, the server application 134 processes the received data. Any suitable processing may be performed by the server application 134. As described, the processing in some embodiments may include, e.g., compressing the received data and/or converting the received data into a format that can be read by data labeling application(s). For example, the received data could be converted to a data format in which points of a 3D point cloud are represented in a list as (x, y, z) coordinates with associated time stamps.

At step 206, the server application 134 sends the processed data and an indication of data labeling task(s), based on the received request, to one or more data labeling applications. Although one data labeling application 104 is shown for illustrative purposes, it should be understood that the server application 134 may send the processed data and indication of data labeling task(s), via a network, to any number of data labeling applications running on different client devices.

At step 208, a data labeling application 104 that receives the processed data generates and displays renderings of one or more point clouds based on the received data. As described, the data labeling application 104 may display the rendered point cloud(s) via a UI that permits a user to navigate and view the point cloud(s) from different perspectives. In addition, the UI may display photographs associated with the rendered point cloud(s), and the data labeling application 104 may provide tools to facilitate labeling of the rendered point cloud(s) via the UI.

At step 210, the data labeling application 104 receives labeling of data in the rendered point cloud(s). In some embodiments, a user may navigate the point cloud(s) spatially and/or temporally and then draw annotations such as cuboids, label points as belonging to particular objects, etc. For example, the user could look around a scene, identify objects of interest, use a mouse to indicate where those objects are located, use the mouse and a keyboard to precisely size cuboids around the objects, etc. In such a case, the user may further navigate forward and/or backwards in time to see where the objects move over time, and label the objects in every frame that is associated with a distinct point in time. As described, the data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, the data labeling application 104 sends the labeled data back to the server application 134. The labeled data may be sent to the server application 134 via a network, such as the Internet, and the server application 134 may then return the labeled data to the customer. In some embodiments, optional verification and/or other processing may be performed prior to returning labeled data to the customer.

Figure 3:
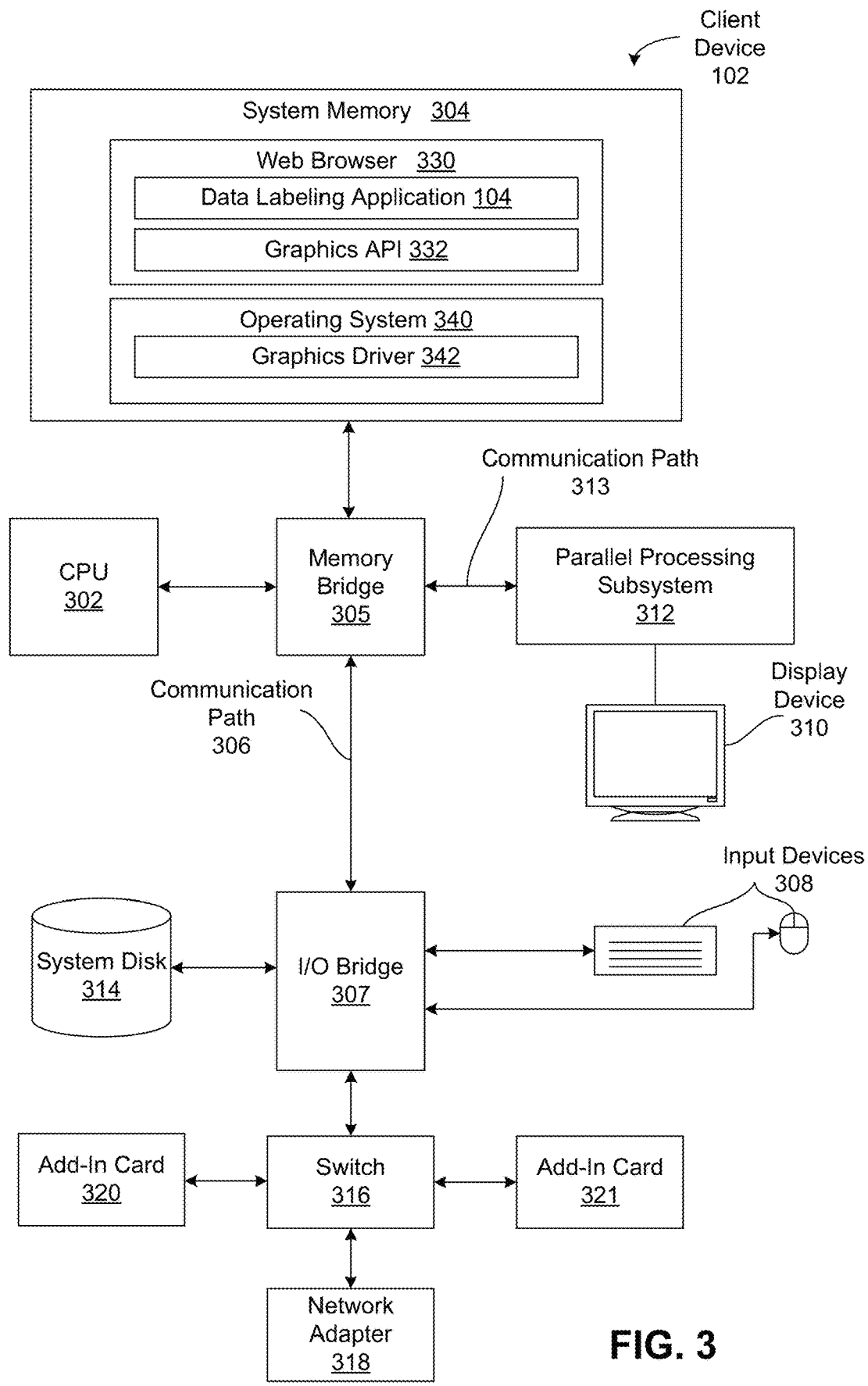
FIG. 3 illustrates one of the client devices shown in FIG. 1, according to various embodiments.

FIG. 3 illustrates one of the client devices $102_{1-N}$, according to one or more embodiments. Although a client device 102 is shown for illustrative purposes, it should be understood that the server 130 and the customer device 110 may include similar physical components as the client device 102, but run different software such as the server application 134.

As shown, the client device 102 includes, without limitation, a central processing unit (CPU) 302 and a system memory 304 coupled to a parallel processing subsystem 312 via a memory bridge 305 and a communication path 313. The memory bridge 304 is further coupled to an I/O (input/output) bridge 307 via a communication path 306, and the I/O bridge 307 is, in turn, coupled to a switch 316.

In operation, the I/O bridge 307 is configured to receive user input information from input devices 308, such as a keyboard or a mouse, and forward the input information to the CPU 302 for processing via the communication path 106 and the memory bridge 305. The switch 316 is configured to provide connections between the I/O bridge 307 and other components of the computer system 300, such as a network adapter 318 and various add-in cards 320 and 321.

As also shown, the I/O bridge 307 is coupled to a system disk 314 that may be configured to store content and applications and data for use by CPU 302 and parallel processing subsystem 312. As a general matter, the system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, the memory bridge 305 may be a Northbridge chip, and the I/O bridge 307 may be a Southbridge chip. In addition, communication paths 306 and 313, as well as other communication paths within the client device 102, may be implemented using any technically suitable protocols, including, without limitation, AGP (Accelerated Graphics Port), HyperTransport, or any other bus or point-to-point communication protocol known in the art.

In some embodiments, the parallel processing subsystem 312 comprises a graphics subsystem that delivers pixels to a display device 310 that may be any conventional cathode ray tube, liquid crystal display, light-emitting diode display, or the like. In such embodiments, the parallel processing subsystem 312 incorporates circuitry optimized for graphics and video processing, including, for example, video output circuitry. Such circuitry may be incorporated across one or more parallel processing units (PPUs) included within the parallel processing subsystem 312. In other embodiments, the parallel processing subsystem 312 incorporates circuitry optimized for general purpose and/or compute processing. Again, such circuitry may be incorporated across one or more PPUs included within the parallel processing subsystem 312 that are configured to perform such general purpose and/or compute operations. In yet other embodiments, the one or more PPUs included within the parallel processing subsystem 312 may be configured to perform graphics processing, general purpose processing, and compute processing operations. The system memory 104 includes at least one device driver 103 configured to manage the processing operations of the one or more PPUs within the parallel processing subsystem 312.

In various embodiments, the parallel processing subsystem 312 may be integrated with one or more of the other elements of FIG. 3 to form a single system. For example, the parallel processing subsystem 312 may be integrated with the CPU 302 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 304 could be connected to CPU 302 directly rather than through memory bridge 305, and other devices would communicate with the system memory 304 via the memory bridge 305 and the CPU 302. In other alternative topologies, the parallel processing subsystem 312 may be connected to the I/O bridge 307 or directly to the CPU 302, rather than to the memory bridge 305. In still other embodiments, the I/O bridge 307 and the memory bridge 305 may be integrated into a single chip instead of existing as one or more discrete devices. Lastly, in certain embodiments, one or more components shown in FIG. 3 may not be present. For example, the switch 316 could be eliminated, and the network adapter 318 and add-in cards 320, 321 would connect directly to the I/O bridge 307.

Illustratively, the data labeling application 104 that runs in the client device 102 is a web application running in a web browser 330. Although shown as a web application for illustrative purposes, the data labeling application 104 may be implemented as a native application or other type of software in alternative embodiments. Further, functionality of the data labeling application 104 may be distributed across multiple pieces of software in some embodiments. As shown, the system memory 316 stores the web browser 330 and an operating system 340 on which the web browser 330 runs. The operating system 340 may be, e.g., Linux® or Microsoft Windows® and includes a graphics driver 342 that implements a graphics API 332 exposed by the web browser 330 for rendering content, via the parallel processing subsystem 312 (and/or the CPU 302). For example, the graphics API 332 could be WebGL (Web Graphics Library), which is a JavaScript API for rendering interactive 3D and 2D graphics within a compatible web browser. In some embodiments, the data labeling application 104 may invoke the graphics API 332 to render 3D point clouds, and the data labeling application 104 may further provide tools that facilitate the labeling of data, according to techniques disclosed herein.

In alternate embodiments, the system 100 may include any number of client devices 102, any number of servers 130, any number of customer devices 110, any number of memories 304, and any number of processors 302 that are implemented in any technically feasible fashion. Further, the client devices 102, the servers 130, the memory 304, and the processor 302 may be implemented via any number of physical resources located in any number of physical locations. For example, the memory 304 and the processor 302 could be implemented in a cloud computing environment or a distributed computing environment that is accessible to the client device 102. The connection topology between the various units in FIGS. 1 and 2 may be modified as desired.

LIDAR Intensity Visualization

Figure 4:
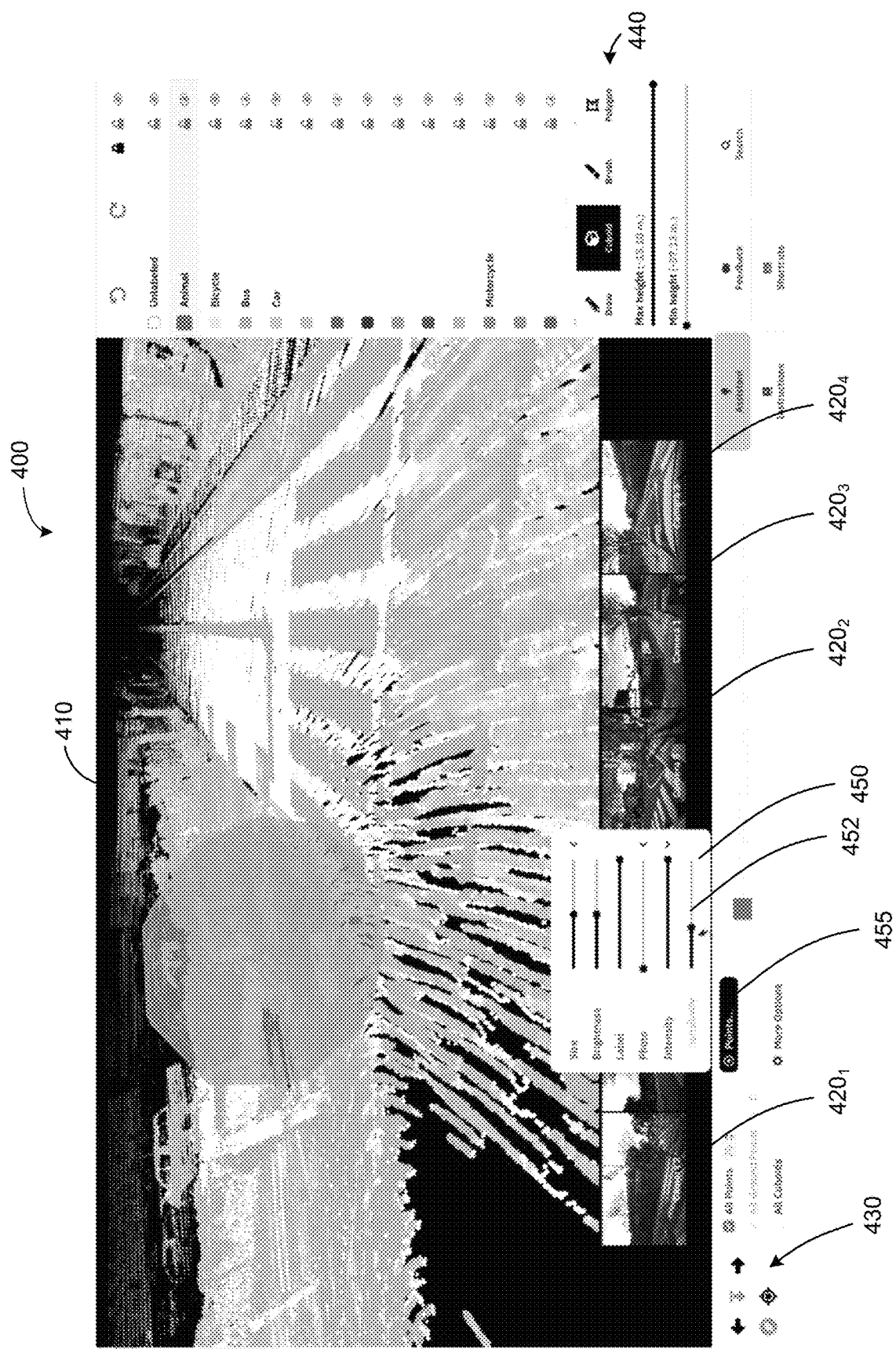
FIG. 4 illustrates an example user interface displaying a point cloud coloring determined based on LIDAR (light detection and ranging) intensity data, according to various embodiments.

FIG. 4 illustrates an example user interface 400 displaying a point cloud coloring determined based on LIDAR intensity data, according to various embodiments. As described, LIDAR intensity refers to the strength of laser light reflected back to a LIDAR sensor (as opposed to diffused), and intensity information may be collected by the LIDAR sensor for each point within a point cloud and laser pulse that generated the point. It should be understood that different materials may exhibit different reflectance properties. For example, asphalt and the paint from lane markings generally reflect light differently. Embodiments attempt to infer different materials, such as asphalt and paint, from LIDAR intensity data.

As shown, the data labeling application 104 generates and causes to be displayed the user interface 400, which includes a rendering 410 of a 3D point cloud in which the colors of points have been determined based on LIDAR intensity data. Illustratively, the point cloud coloring determined from LIDAR intensity data highlights certain materials in the scene, such as paint on the roads corresponding to lane markings and crosswalks. Doing so may help a user visualize and label objects comprising such materials. Although coloring is used herein as a reference example, in some embodiments, other characteristics such as the sizes of points may be determined based on LIDAR intensity data using techniques similar to those disclosed herein. In some embodiments the default point cloud coloring may be no color, or a custom color (e.g., green for ground points). In addition, some embodiments may permit a user to select point cloud colorings based on the relative height of points.

In some embodiments, the data labeling application 104 may determine a point cloud coloring from LIDAR intensity data by parameterizing an activation function, and then using the activation function to map LIDAR intensity values associated with points in the point cloud to corresponding colors. In particular, the activation function may be parameterized based on a distribution of the LIDAR intensity values and a user-configurable sensitivity, as discussed in greater detail below. As used herein, an "activation function" is a type of function that defines an output given an input and activates its effect beginning at a certain threshold. Further, the effect may be activated over an activation window. Examples of activation functions include the sigmoid function, the arc-tangent function, and the hyperbolic-tangent function. As used herein, "parameterizing" the activation function refers to assigning values to parameters of the activation function. As discussed in greater detail below, the sensitivity is a user-configurable value that can be used to parameterize an activation function by changing the threshold at which an effect of the activation function begins. At the same time, the distribution of LIDAR intensity values can be used to parameterize an activation function by changing the activation window over which the effect of the activation function is activated.

In the example of FIG. 4, the effect of the activation function changes the colors of points in the rendered point cloud to orange when the LIDAR intensities associated with those points are greater than a threshold. As a result, materials that are associated intensity values less than the threshold, such as asphalt, are colored white in the rendering 410, while other materials that are associated with intensity values greater than the threshold, such as metal, paint of road markings, etc. are colored various shades of orange in the rendering 410, based on the activation function. Such a visualization emphasizes bands of intensity values that correlate to particular materials with different reflectance properties. As a result, the visualization permits users to discern between such materials, which can be beneficial to users who need to label objects made up of those materials. In particular, the visualization is more informative than traditional visualizations, in which LIDAR intensity values were mapped to respective colors using a simple color gradient that did not distinguish between different types of materials.

Figure 5:
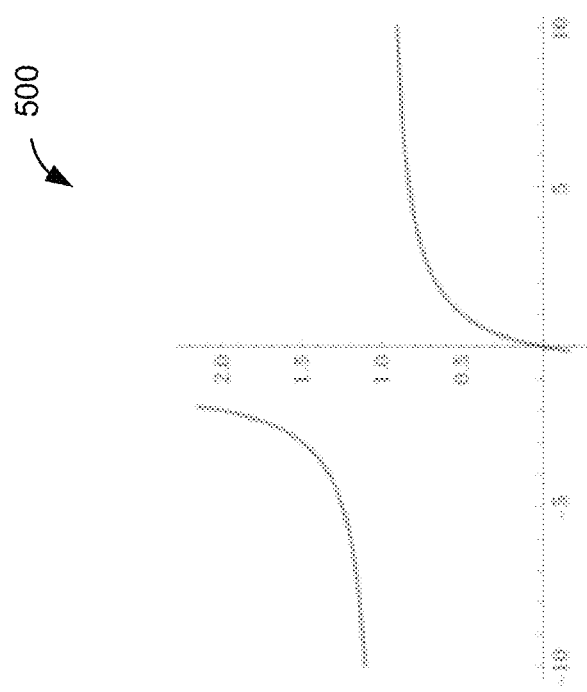
FIG. 5 illustrates a graph of an example activation function that may be used to determine point cloud colorings from LIDAR intensity data, according to various embodiments.

FIG. 5 illustrates a graph 500 of an example activation function that the data labeling application may use to determine point cloud colorings (and/or sizes) from LIDAR intensity data, according to various embodiments. As shown, the activation function has form $$\frac{a(x-d)}{(x-d)+1} + bc.$$

Although the function is shown as producing positive values below a threshold of 0 for illustrative purposes, in some embodiments, the value of x is not allowed to be negative, as x represents the amount of laser light received back by the LIDAR sensor, which should be between none to all, or [0, 1] scaled by different byte storages. For example, the data labeling application may normalize the values of x to [0, 1]. Further, the threshold of 0 is shown for illustrative purposes, but the threshold value may be user-configurable in embodiments. For example, a user-configurable sensitivity may be provided via a slider in the UI 400, and adjusting such a slider may affect the threshold of the activation function. In such a case, adjusting the slider would shift the graph 500 of the activation function to the left or right. After zero, the activation function increases monotonically toward a maximum value, shown as 1. Similar to the threshold value, the maximum value and/or the rate at which such a maximum value is reached may also be user-configurable in some embodiments via, e.g., sliders.

Figure 6:
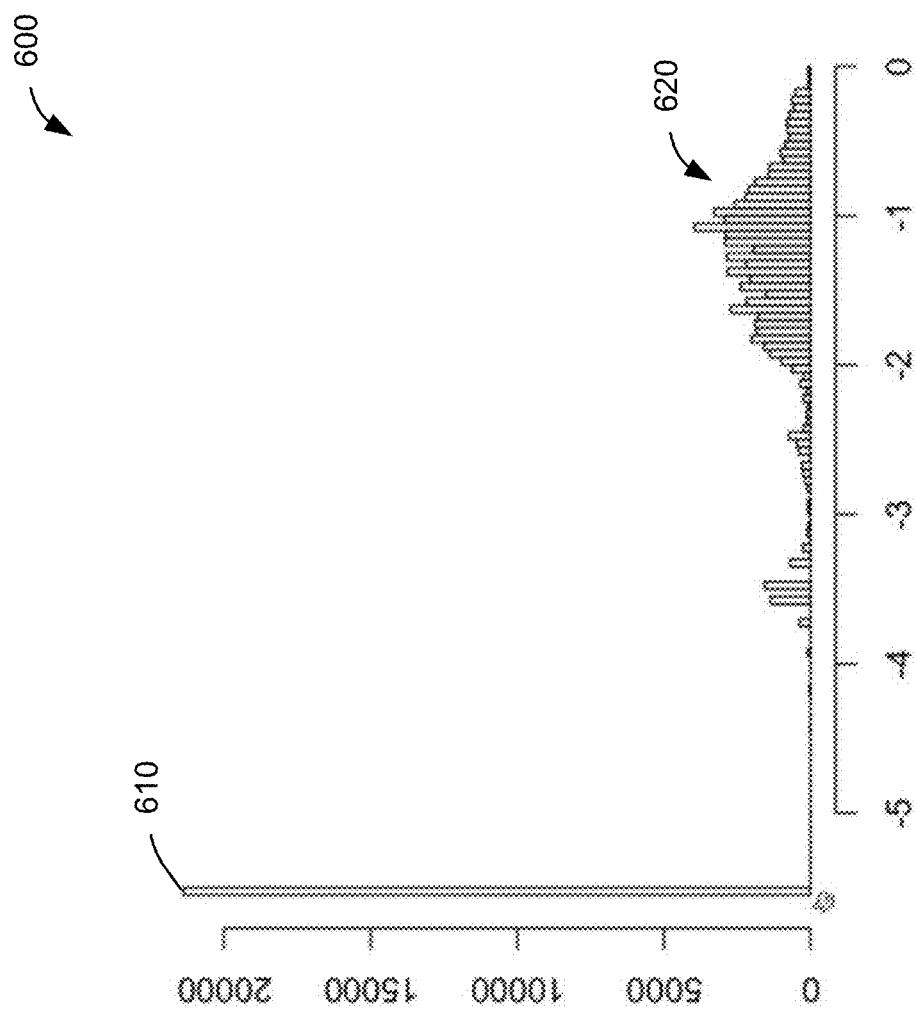
FIG. 6 illustrates a graph showing an example histogram indicating a distribution of intensity values in a three-dimensional scene, according to various embodiments.

As described, the data labeling application 104 may, in some embodiments, parameterize an activation function for coloring point clouds based on LIDAR intensity data using a user-configurable sensitivity and statistics derived from a distribution of intensity values. FIG. 6 illustrates a graph 600 showing an example histogram indicating a distribution of intensity values in a 3D scene, according to various embodiments. As shown, the histogram includes a large bar 610 at zero intensity and a number of smaller bars 620 at various intensities. The large bar 610 corresponds to points associated with materials such as glass and asphalt that do not reflect light, resulting in zero LIDAR intensity for those points. The smaller bars 620 correspond to other materials such as metal and paint that reflect some amount of light, resulting in nonzero LIDAR intensity values for those points.

In a particular embodiment, the activation function of form $$\frac{a(x-d)}{(x-d)+1} + bc,$$

described above with respect to FIG. 5, may be the specific activation function Magnitude of effect $$\text{Magnitude of effect} \cdot \left( \frac{a(b(x-c))}{(a(b(x-c))+1) - \text{sensitivity} \cdot (\text{mean}+\text{variance})} \right),$$

where the Magnitude of effect and the sensitivity are a user-configurable magnitudes of the effect (e.g., highlighting) and sensitivity, respectively; mean+variance is a sum of the mean and variance of the distribution of LIDAR intensities, such as that shown in the graph 600; and a, b, and c are constants that are tuned, either manually or automatically, to extract the intensities of interest across different distributions and transformations. Given any particular point, the data labeling application 104 may use such an equation to determine a magnitude of the visual modulation (e.g., highlighting) used to visually represent the intensity values of interest. The use of LIDAR intensity distribution(s) is advantageous, as the actual LIDAR intensity values that the data labeling application 104 receives may be in different formats and the data labeling application 104 should be able to determine point cloud colorings based on LIDAR intensity data regardless of the format of such data. For example, customers may process their LIDAR intensity data for internal purposes using various normalizations, transformations, and/or corrections (e.g., increasing the intensities of points far away or correcting for adverse weather conditions), resulting in LIDAR intensity data in different formats. In such a case, an intensity value of 0.5 in LIDAR data from two customers may not mean the same thing. Parameterizing an activation function based on statistics calculated based on a distribution of LIDAR intensities solves this problem.

Figure 7:
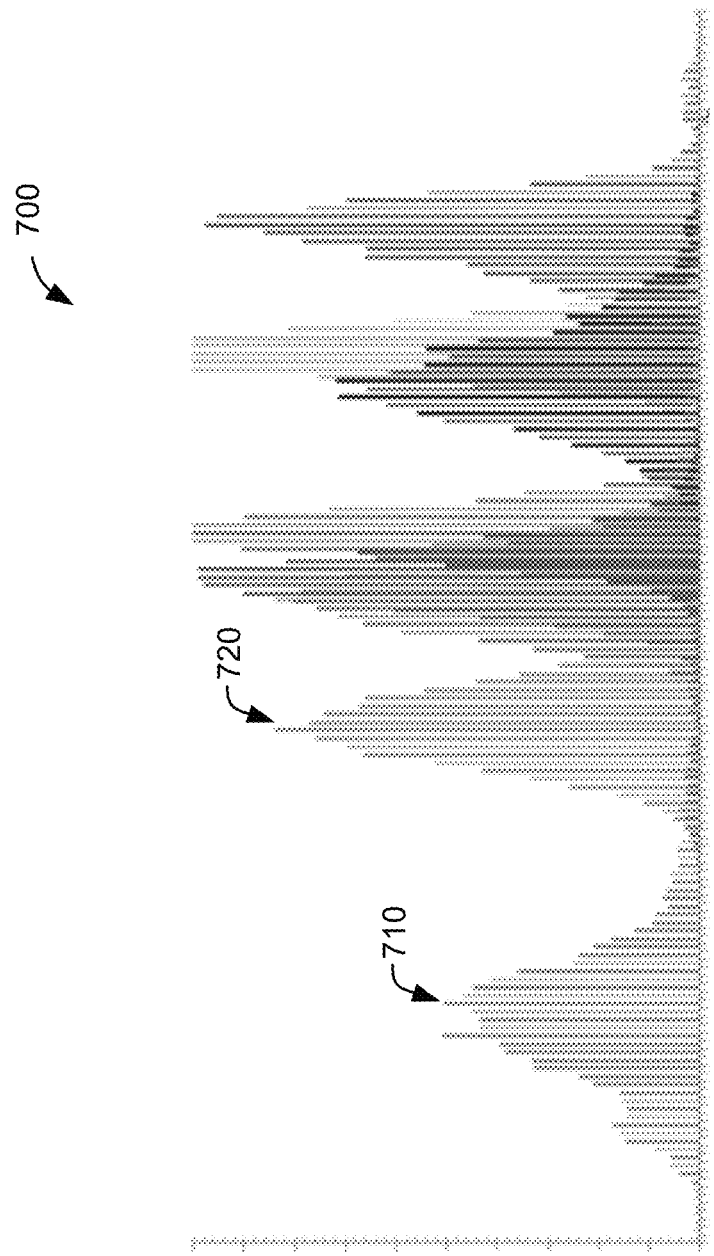
FIG. 7 illustrates a graph showing an example of the expected LIDAR intensity distributions from different materials.

The parameterization of an activation function described above with respect to FIG. 6 does not resolve ambiguities where the LIDAR intensity distributions from different materials overlap (i.e., have the same values). FIG. 7 illustrates a graph 700 showing an example of the expected LIDAR intensity distributions from different materials. Such distributions result from the physical reflectance properties of the materials (e.g., asphalt, paint, metal, trees, etc.) and are well known. The materials may also be assumed to be relatively standard. For example, the type of paint used for road markings is standard across the world.

As shown, the distributions of LIDAR intensity values from the materials form respective bands that overlap in the histogram of the graph 700. For example, the distributions 710 and 720 correspond to different materials and overlap. Where such overlaps occur, a histogram of measured LIDAR intensities, such as that of FIG. 6, will indicate the cumulative contributions from both distributions.

In some embodiments, the data labeling application 104 may distinguish individual LIDAR intensity distributions associated with various materials in an overall LIDAR intensity distribution. For example, in some embodiments, the data labeling application 104 may perform a Fourier transform on the distribution of LIDAR intensities associated with a 3D point cloud to obtain individual components that are each associated with a different material. In such cases, the data labeling application 104 may color points that are associated with different components of the Fourier transform differently, i.e., the data labeling application 104 may color points based on a function that maps points associated with the different components to distinct colors. As another example, in some embodiments, the data labeling application 104 may apply a clustering technique to obtain clusters of intensity values associated with different materials. In a particular embodiment, the data labeling application 104 may distinguish between road markings and other materials on a tile-by-tile basis by computing two clusters (one of which may be associated with the road marking material and the other of which may be associated with other materials) in each of a number of tiles within the entire scene, or a region thereof, determining a difference between the clusters in the tiles, and aggregating the results in order to distinguish intensity values associated with road markings from intensity values associated with other materials. Doing so allows a specific range of LIDAR intensity values of interest, associated with the road markings in this case, to be discerned. Road markings in particular lend themselves to a tile-based clustering approach, as road markings tend to change on a road discretely. Similar to the Fourier transform example discussed above, the data labeling application 104 may color points that are associated with different clusters differently, i.e., the data labeling application 104 may color points based on a function that maps points associated with the different clusters to distinct colors.

Returning to FIG. 4, the UI 400 provides a panel 450 that includes a sensitivity slider 452 for adjusting a user-configurable sensitivity which, as described, may be used along with, e.g., statistics derived from a distribution of intensity values to parameterize an activation function for coloring point clouds based on LIDAR intensity data. Illustratively, the panel 450 is displayed by the data labeling application 104 in response to user selection of a "points" button 455. Although shown as a pop-up panel 450 that includes the sensitivity slider 452 for illustrative purposes, functionality of the panel 450 and the sensitivity slider 452 may be exposed via any suitable UI element or elements in other embodiments. Further, the sensitivity level set by a user via the slider 452 may be used to parameterize the activation function in any suitable manner. As described, in some embodiments, the threshold at which an effect of the activation function is activated may be set based on the user-configurable sensitivity. As another example, a maximum value of the effect and/or a rate at which such a maximum value is reached may be set based on the user-configurable sensitivity in some embodiments.

Use of LIDAR intensity data can also help mitigate calibration errors that might affect point cloud colorings determined from other sources such as photographic data, as the LIDAR intensity data is part of the LIDAR data itself. Calibration information, which may include the lengths of camera lenses, the positions of the cameras in world space, and the orientations and angles of the cameras, may be used to determine the locations at which points in a LIDAR point cloud would appear in captured photographs (e.g., the photographs $420_{1-4}$), based on which colors may be derived for those points. However, calibration errors may cause incorrect point cloud colorings to be determined from photographs. By contrast, intensity data is part of the LIDAR data itself and does not require calibration, so the LIDAR intensity data may be more reliable and used to identify and mitigate calibration errors.

In some embodiments, the UI 400 may permit a user to select between point cloud colorings determined from different data sources, such as LIDAR intensity data, photographic data, and label data, as well as how to blend such point cloud colorings together in a rendering of the point cloud, according to techniques disclosed in the patent application entitled "VISUALIZATION TECHNIQUES FOR DATA LABELING" (Ser. No. 16/518,809). By adjusting how different point cloud colorings are blending via "Label," "Photo," and "Intensity" sliders in a panel 450, a user can identify whether labels assigned to points in the point cloud are accurate. For example, if a point is a certain color associated with cars when the label point cloud coloring is made visible, indicating that the point has been labeled as belonging to car, but the point is the same color as surrounding pavement when a LIDAR intensity point cloud coloring is made visible, then it can be determined that the point has been mislabeled. Illustratively, the user has selected via the panel 450 of the UI 400 to make the LIDAR intensity and the label point cloud colorings visible, but the photo point cloud coloring invisible. In response, the data labeling application 104 generates the rendering 410 of the 3D scene by blending the LIDAR intensity and label point cloud colorings. Any suitable blending technique, such as dissolve, may be employed by the data labeling application 104.

Illustratively, the UI 400 includes navigation controls 430 that permit a user to rotate (e.g., by 90 degrees with each press of the left or right arrows, or to see a bird's eye view with a press on the downward arrow) the rendering 410, such that the point cloud can be viewed from different perspectives. The navigation controls 430 further permit the user to follow an object, such as a self-driving vehicle from which the photographs $420_{1-6}$ and 3D point cloud data were captured, by pressing on the compass icon, or to follow a selection by pressing on the target icon. The user may also navigate freely within a 3D scene using, e.g., the w, a, s, and d keys on a keyboard or navigation controls provided via the UI 400, as well as zoom in and out using, e.g., a mouse scroll wheel or a trackpad. Further, the user interface 400 may also provide a visualization slider and shade points by depth, density, and local occlusion, which is a form of synthetic lighting that gives the points 3D structure that may help users to disambiguate what they see from different perspectives after the users move away from the origin. Otherwise, it may be unclear at other angles the orientation of points in 3D space, as some sides of objects may be occluded and not represented by points in the point cloud. For example, based on the depths of pixels in the rendering 410, the data labeling application 104 could perform a convolution for each pixel that takes the differences in depth of the pixel and its neighboring pixels, thereby distinguishing points that are closer to each other and further away, and adds a shading element to the pixel based on such differences. In addition, the UI 400 permits users to navigate through time to view renderings of frames associated with different points in time. This assumes that the data labeling application 104 receives 3D data (e.g., LIDAR data) as a series of point clouds, also referred to herein as a "video," with each of the point clouds corresponding to a respective time stamp. For example, the 3D data could be a video at 5 Hz, which would include five frames per second, any of which the user may select to view. In some embodiments, the UI 400 may also permit a user to view point clouds from multiple frames simultaneously by superimposing the frames on top of each other, rather than requiring the user to step through the frames one by one. Doing so may help the user to visualize trajectories of objects (and assigned labels) over time After navigating to a desired view (and time), the user may tag points as belonging to particular types of objects, draw annotations in the form of cuboids, or otherwise label data in the 3D scene using the labeling tools 440 provided by the data labeling application 104. Illustratively, the labeling tools 440 include a polygon tool, a draw tool, and a brush tool, that can be used to select points for labeling. The polygon and draw tools permit the user to draw polygons and arbitrary selection shapes, respectively, while the brush tool permits free-form labeling of points using a brush of a user-specified size. Further, the labeling tools 440 include a cuboid tool for selecting points within cuboids and adding cuboid annotations.

Figure 8:
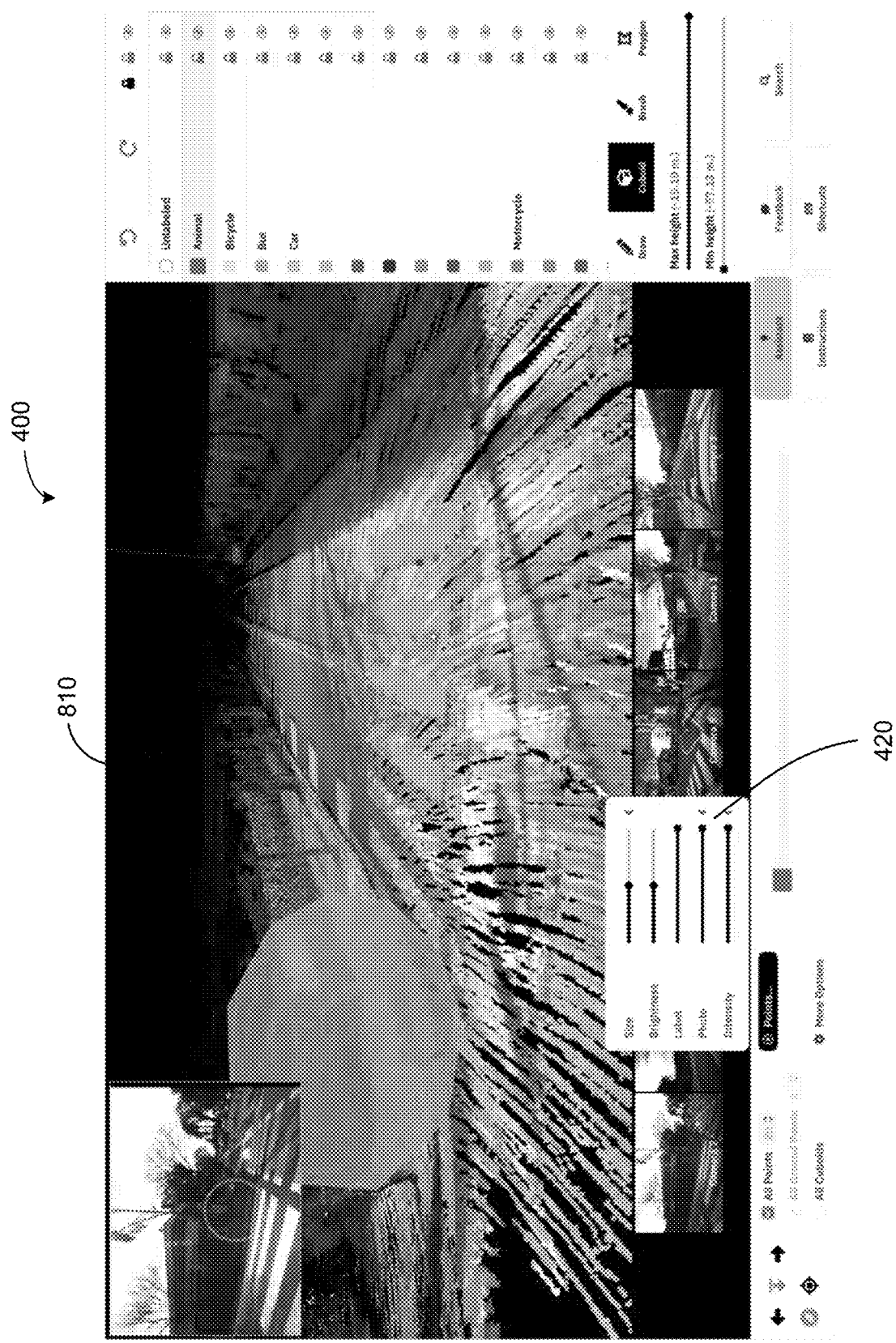
FIG. 8 illustrates an example user interface displaying a point cloud coloring determined based on photographic, label, and LIDAR intensity data, according to various embodiments.

FIG. 8 illustrates the example user interface 400, but displaying a point cloud coloring determined based on photographic, label, and LIDAR intensity data, according to various embodiments. As shown, a rendering 810 included in the user interface 400 is generated by blending the point cloud colorings determined based the on photographic, label, and LIDAR intensity data, according to a user selection made via sliders in the panel 420. Similar to the rendering 410 discussed above with respect to FIG. 4, the rendering 810 highlights in yellow certain materials in the scene, such as paint on the roads corresponding to lane markings and crosswalks. In addition, the rendering 810 includes colors from photographs (e.g., the photographs $420_{1-4}$) for points that are not highlighted, which may include points for which the activation function threshold described above has not been met.

Figure 9:
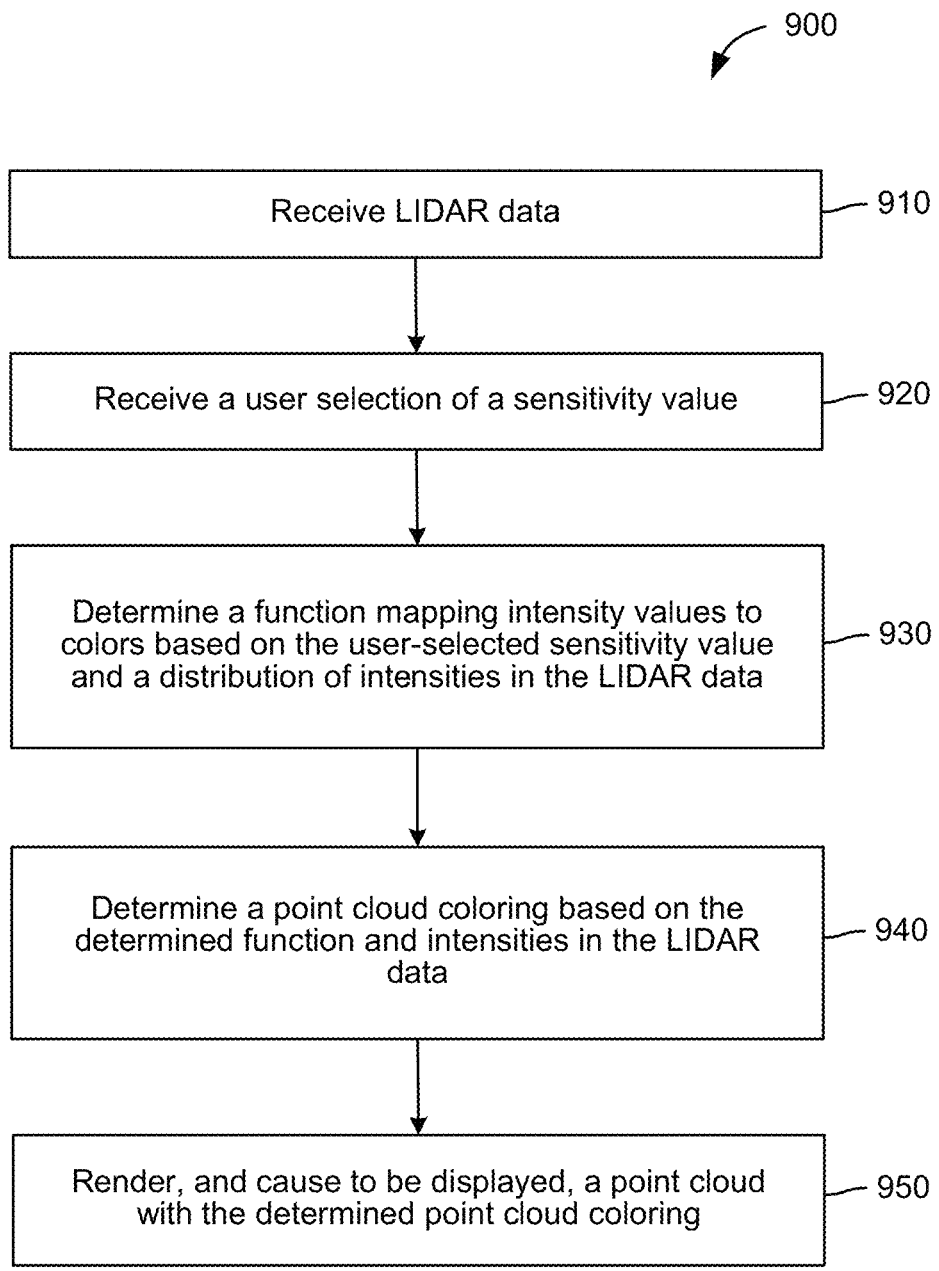
FIG. 9 is a flow diagram of method steps for visualizing LIDAR intensity data, according to various embodiments.

FIG. 9 is a flow diagram of method steps for visualizing LIDAR intensity data, according to various embodiments. Although the method steps are described with reference to the system of FIGS. 1 and 3, persons skilled in the art will understand that any system may be configured to implement the method steps, in any order, in other embodiments.

As shown, a method 900 begins at step 910, where a data labeling application 104 receives LIDAR data. The LIDAR data may include, e.g., a point cloud and associated intensity data for each point in the point cloud, among other things. In some embodiments, the received data may include processed data that is sent by the server application 134 to the data labeling application 104 via a network, as described above with respect to FIGS. 1-2. Optionally, the data labeling application 104 may also down sample the received LIDAR data, in which case the data labeling application 104 may process, including determining colors for, the down sampled LIDAR data rather than the received LIDAR data.

At step 920, the data labeling application 104 receives a user selection of a sensitivity value. The user may select a sensitivity value in any suitable manner. For example, the data labeling application 104 may provide a UI, such as the UI 400 described above with respect to FIGS. 4 and 8, that includes a panel with a slider for adjusting the sensitivity.

At step 930, the data labeling application 104 determines a function mapping intensity values to colors based on the user-selected sensitivity value and a distribution of intensities in the received LIDAR data. In some embodiments, the determined function may be an activation function, such as a function of the form $$\frac{a(x-d)}{(x-d)+1} + bc$$

or the specific function Magnitude of effect.

$$\text{Magnitude of effect} \cdot \left( \frac{a(b(x-c))}{(a(b(x-c))+1) - \text{sensitivity} \cdot (\text{mean} + \text{variance})} \right),$$

that controls the colors assigned to different intensity values. Such an activation function may be parameterized based on the user-selected sensitivity and based on statistics, such as a mean plus a variance, computed for the distribution of intensities, as described above with respect to FIGS. 4-6. In other embodiments, the data labeling application 104 may compute a Fourier transform of the distribution of intensities or perform a clustering technique on the intensities associated with a 3D point cloud to estimate individual distributions associated with different materials, based on which the data labeling application 104 may determine a function mapping intensity values to colors, as described above with respect to FIG. 7.

At step 940, the data labeling application 104 determines a point cloud coloring based on the determined function which maps intensity values to colors and intensities in the received LIDAR intensity data. That is, the data labeling application 104 plugs LIDAR intensity values associated with points in the point cloud into the determined function, in order to obtain colors for those points.

Then, at step 950, the data labeling application 104 renders, and causes to be displayed, a point cloud with the determined point cloud coloring. In some embodiments, such a rendering may be displayed, via a display device, as part of a user interface that facilitates labeling of data, such as the UI 400 described above with respect to FIGS. 4 and 8. In some embodiments, the point cloud coloring determined from the LIDAR intensity data may also be blended with point cloud colorings determined from other sources such as photographic or label data, based on a user selection, in the rendering.

Although discussed herein primarily with respect to coloring as a reference example, in some embodiments, the data labeling application 104 may also determine other characteristics such as the sizes of points to be rendered based on LIDAR intensity data and an activation function. For example, the sizes of points associated with high intensity values could be increased up to two times based on the activation function. That is, point colorings and/or sizes may be determined using techniques disclosed herein.

Although discussed herein primarily with respect to LIDAR intensity, techniques disclosed herein may be used to visualize other types of intensity and similar data. For example, radar points may each be defined by a position and a velocity vector and, similar to LIDAR intensity, the distribution of radar data may be considered and an activation function used to determine the effect and/or size with which to show the radar points, i.e. some proportion of the radar points may be shown based on the activation function. In the case of radar points, a small factor of the velocity vector magnitude, which is akin to LIDAR intensity, may be considered in order to distinguish between different radar points. The difference between radar and LIDAR is that radar data typically includes well defined positions and vectors, whereas LIDAR intensity values may be affected by a multitude of factors, including proprietary transformations, devices, environment, weather, angle, humidity, etc.

In sum, techniques are disclosed for coloring a point cloud based on colors derived from intensity data. In particular, such a coloring may use an activation function that controls the colors assigned to different intensity values and is parameterized based on statistics computed for a distribution of intensities associated with a 3D scene and a user-selected sensitivity value. Alternatively, a Fourier transform of the distribution of intensities or a clustering of the intensities may be used to estimate individual distributions associated with different materials, based on which the point cloud coloring may be determined from intensity data.

Advantageously, the disclosed techniques for visualizing intensity permit point cloud colorings to be determined from intensity data in different formats. In addition, materials with different reflectance properties can be shown in different colors. The different colors applied to materials can, in turn, facilitate the labeling of objects comprising such materials and/or verification of prior labeling. These technical advantages represent one or more technological advancements over prior art approaches.

1. Some embodiments include a computer-implemented method for visualizing intensity data, the method comprising receiving intensity data associated with a scene, wherein the intensity data includes a point cloud and a plurality of intensity values associated with points in the point cloud, determining a function that maps the plurality of intensity values to one or more colors based on a distribution of the plurality of intensity values, determining, based on the function and the plurality of intensity values, at least one of colors and sizes for the points in the point cloud, and rendering the point cloud based on the at least one of colors and sizes for the points.

2. The computer-implemented method of clause 1, wherein the function is further determined based on a sensitivity value.

3. The computer-implemented method of any of clauses 1-2, wherein the function is an activation function; and determining the function includes determining a parameterization of the activation function based on the sensitivity value and statistics determined for the distribution of the plurality of intensity values.

4. The computer-implemented method of any of clauses 1-3, wherein determining the parameterization of the activation function includes determining a threshold associated with the activation function based on the sensitivity value.

5. The computer-implemented method of any of clauses 1-4, wherein the activation function has form $$\frac{a(x-d)}{(x-d)+1} + bc.$$

6. The computer-implemented method of any of clauses 1-5, wherein the sensitivity value is selected by a user via a control element of a user interface.

7. The computer-implemented method of any of clauses 1-6, wherein the control element is a slider.

8. The computer-implemented method of any of clauses 1-7, wherein determining the function includes determining a Fourier transform of the distribution of the plurality of intensity values.

9. The computer-implemented method of any of clauses 1-8, wherein determining the function includes clustering intensity values associated with points in the point cloud within at least one tile.

10. The computer-implemented method of any of clauses 1-9, wherein the intensity data includes at least one of LIDAR (light detection and ranging) intensity data and radar data.

11. Some embodiments include a computer-readable storage medium including instructions that, when executed by a processing unit, cause the processing unit to perform operations for visualizing intensity data, the operations comprising receiving intensity data associated with a scene, wherein the intensity data includes a point cloud and a plurality of intensity values associated with points in the point cloud, determining a function that maps the plurality of intensity values to one or more colors based on a distribution of the plurality of intensity values, determining, based on the function and the plurality of intensity values, at least one of colors and sizes for the points in the point cloud, and rendering the point cloud based on the at least one of colors and sizes for the points.

12. The computer-readable storage medium of clause 11, wherein the function is further determined based on a sensitivity value.

13. The computer-readable storage medium of any of clauses 11-12, wherein the function is an activation function, and determining the function includes determining a parameterization of the activation function based on the sensitivity value and statistics determined for the distribution of the plurality of intensity values.

14. The computer-readable storage medium of any of clauses 11-13, wherein determining the parameterization of the activation function includes determining a threshold associated with the activation function based on the sensitivity value.

15. The computer-readable storage medium of any of clauses 11-14, wherein the activation function has form $$\frac{a(x-d)}{(x-d)+1} + bc.$$

16. The computer-readable storage medium of any of clauses 11-15, wherein the sensitivity value is selected by a user via a control element of a user interface.

17. The computer-readable storage medium of any of clauses 11-16, wherein determining the function includes determining a Fourier transform of the distribution of the plurality of intensity values.

18. The computer-readable storage medium of any of clauses 11-17, wherein determining the function includes clustering intensity values associated with points in the point cloud within at least one tile.

19. The computer-readable storage medium of any of clauses 11-18, wherein the intensity data includes at least one of LIDAR (light detection and ranging) intensity data and radar data.

20. Some embodiments include a system comprising a memory storing a rendering application, and a processor that is coupled to the memory and, when executing the rendering application, is configured to receive intensity data associated with a scene, wherein the intensity data includes a point cloud and a plurality of intensity values associated with points in the point cloud, determine a function that maps the plurality of intensity values to one or more colors based on a distribution of the plurality of intensity values, determine, based on the function and the plurality of intensity values, at least one of colors and sizes for the points in the point cloud, and render the point cloud based on the at least one of colors and sizes for the points.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for visualizing data, the method comprising:
receiving intensity data associated with a scene, wherein the intensity data includes a point cloud and a plurality of intensity values associated with points in the point cloud;
determining, based on statistics computed for one or more distributions of the plurality of intensity values, one or more visual characteristics associated with the points in the point cloud; and
rendering the point cloud based on the one or more visual characteristics.

2. The computer-implemented method of claim 1, wherein the one or more visual characteristics comprise colors of the points in the point cloud, and further comprising, prior to rendering the point cloud, blending the colors with additional colors from photograph data associated with the scene.

3. The computer-implemented method of claim 1, wherein the one or more visual characteristics comprise colors of the points in the point cloud, and further comprising, prior to rendering the point cloud, blending the colors with additional colors from label data indicating types of objects within the scene.

4. The computer-implemented method of claim 1, wherein determining the one or more visual characteristics associated with the points in the point cloud comprises parameterizing a function that maps the plurality of intensity values to the one or more visual characteristics based on the statistics.

5. The computer-implemented method of claim 4, wherein the function assigns a first visual characteristic to a first point with a first intensity value that is less than a threshold and a second visual characteristic to a second point with a second intensity value that is greater than the threshold.

6. The computer-implemented method of claim 1, wherein determining the one or more visual characteristics associated with the points in the point cloud comprises parameterizing a function that maps the plurality of intensity values to the one or more visual characteristics based on a user-selected sensitivity value associated with the statistics.

7. The computer-implemented method of claim 1, further comprising computing the statistics based on clusters of intensity values associated with one or more tiles included in the scene.

8. The computer-implemented method of claim 1, further comprising computing the statistics based on a Fourier transform of the one or more distributions of the plurality of intensity values.

9. The computer-implemented method of claim 1, wherein the one or more visual characteristics comprise sizes of the points in the point cloud.

10. The computer-implemented method of claim 1, wherein the intensity data includes at least one of LIDAR (light detection and ranging) intensity data and radar data.

11. One or more non-transitory computer readable media storing instructions that, when executed by one or more processors, cause the one or more processors to perform the steps of:
receiving intensity data associated with a scene, wherein the intensity data includes a point cloud and a plurality of intensity values associated with points in the point cloud;
determining, based on statistics computed for one or more distributions of the plurality of intensity values, one or more visual characteristics associated with the points in the point cloud; and
rendering the point cloud based on the one or more visual characteristics.

12. The one or more non-transitory computer readable media of claim 11, wherein the one or more visual characteristics comprise colors of the points in the point cloud, and wherein the instructions further cause the one or more processors to perform the step of blending the colors with additional colors from photograph data associated with the scene prior to rendering the point cloud.

13. The one or more non-transitory computer readable media of claim 11, wherein the one or more visual characteristics comprise colors of the points in the point cloud, and wherein the instructions further cause the one or more processors to perform the step of blending the colors with additional colors from label data indicating types of objects within the scene prior to rendering the point cloud.

14. The one or more non-transitory computer readable media of claim 11, wherein determining the one or more visual characteristics associated with the points in the point cloud comprises parameterizing a function that maps the plurality of intensity values to the one or more visual characteristics based on the statistics.

15. The one or more non-transitory computer readable media of claim 14, wherein the function assigns a first visual characteristic to a first point with a first intensity value that is less than a threshold and a second visual characteristic to a second point with a second intensity value that is greater than the threshold.

16. The one or more non-transitory computer readable media of claim 14, wherein the function has form $$\frac{a(x-d)}{(x-d)+1} + bc.$$

17. The one or more non-transitory computer readable media of claim 11, wherein determining the one or more visual characteristics associated with the points in the point cloud comprises parameterizing a function that maps the plurality of intensity values to the one or more visual characteristics based on a user-selected sensitivity value associated with the statistics.

18. The one or more non-transitory computer readable media of claim 11, wherein the statistics comprise a mean and a variance associated with the one or more distributions of the plurality of intensity values.

19. The one or more non-transitory computer readable media of claim 11, wherein the instructions further cause the one or more processors to perform the step of computing the statistics based on at least one of clusters of intensity values associated with one or more tiles included in the scene or a Fourier transform of the one or more distributions of the plurality of intensity values.

20. A system, comprising:
a memory that stores instructions, and
a processor that is coupled to the memory and, when executing the instructions, is configured to:
receive intensity data associated with a scene, wherein the intensity data includes a point cloud and a plurality of intensity values associated with points in the point cloud;
determine, based on statistics computed for one or more distributions of the plurality of intensity values, one or more visual characteristics associated with the points in the point cloud; and
render the point cloud based on the one or more visual characteristics.

* * * * *